United States Patent
Bandela et al.

(10) Patent No.: US 10,462,498 B2
(45) Date of Patent: Oct. 29, 2019

(54) PROVIDING OPTIONS TO LIVE STREAM MULTIMEDIA CONTENT

(71) Applicant: The DIRECTV Group, Inc., El Segundo, CA (US)

(72) Inventors: Sudheer Bandela, Torrance, CA (US); Binny Asarikuniyil, Cerritos, CA (US); Hai Nguyen, Torrance, CA (US); Heather Truong, Anaheim, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 93 days.

(21) Appl. No.: 15/426,146

(22) Filed: Feb. 7, 2017

(65) Prior Publication Data

US 2018/0227600 A1    Aug. 9, 2018

(51) Int. Cl.
| | |
|---|---|
| *G06F 3/00* | (2006.01) |
| *G06F 13/00* | (2006.01) |
| *H04N 5/445* | (2011.01) |
| *H04N 21/2187* | (2011.01) |
| *H04N 21/488* | (2011.01) |
| *H04N 21/433* | (2011.01) |
| *H04N 21/45* | (2011.01) |
| *H04N 21/466* | (2011.01) |
| *H04L 29/06* | (2006.01) |
| *H04N 21/643* | (2011.01) |
| *H04N 21/438* | (2011.01) |
| *H04N 21/4627* | (2011.01) |

(52) U.S. Cl.
CPC ..... *H04N 21/2187* (2013.01); *H04L 65/4084* (2013.01); *H04N 21/4334* (2013.01); *H04N 21/4532* (2013.01); *H04N 21/4668* (2013.01); *H04N 21/4882* (2013.01); *H04N 21/4383* (2013.01); *H04N 21/4627* (2013.01); *H04N 21/64322* (2013.01)

(58) Field of Classification Search
CPC .......... H04N 21/6432; H04N 21/4882; H04N 21/4627; H04N 21/4383; H04N 21/2187
See application file for complete search history.

(56) References Cited

U.S. PATENT DOCUMENTS

| | | | |
|---|---|---|---|
| 6,792,615 B1 | 9/2004 | Rowe et al. | |
| 7,209,632 B2 | 4/2007 | Nono | |
| 8,180,911 B2 | 5/2012 | Banet et al. | |
| 8,453,185 B2 | 5/2013 | Bonfrer | |
| 8,621,508 B2 | 12/2013 | Rowe et al. | |
| 8,689,274 B2 | 4/2014 | Li et al. | |
| 8,819,738 B2 | 8/2014 | Gresta | |
| 9,129,227 B1* | 9/2015 | Yee | G06N 99/005 |
| 9,154,824 B2 | 10/2015 | Wiser et al. | |
| 9,420,349 B2 | 8/2016 | Harper et al. | |

(Continued)

*Primary Examiner* — Nasser M Goodarzi
*Assistant Examiner* — Patrick A Ryan
(74) *Attorney, Agent, or Firm* — Baker Botts, LLP (57) ABSTRACT

In one embodiment, a set-top box determines whether to communicate a notification to a user device to live stream multimedia content. The notification comprises an option to initiate live streaming of the multimedia content. The set-top box communicates the notification to the user device to live stream the multimedia content. A user device communicates a selection to initiate live streaming of the multimedia content to the set-top box. In response to the selection, the set-top box live streams the multimedia content to the user device.

18 Claims, 4 Drawing Sheets

(56) References Cited

U.S. PATENT DOCUMENTS

| | | | |
|---|---|---|---|
| 9,462,028 B1* | 10/2016 | Levinson | H04L 65/602 |
| 2009/0298485 A1* | 12/2009 | Lee | G11B 19/025 |
| | | | 455/414.3 |
| 2010/0037266 A1* | 2/2010 | Rahman | H04N 5/44543 |
| | | | 725/56 |
| 2010/0146560 A1* | 6/2010 | Bonfrer | H04N 7/163 |
| | | | 725/62 |
| 2015/0195594 A1* | 7/2015 | Hicks | H04N 21/2665 |
| | | | 725/25 |
| 2015/0382031 A1 | 12/2015 | Truong et al. | |
| 2016/0191979 A1 | 6/2016 | Perinchery et al. | |

* cited by examiner

PROVIDING OPTIONS TO LIVE STREAM MULTIMEDIA CONTENT

TECHNICAL FIELD

The present disclosure generally relates to streaming multimedia content, and, in particular, to live streaming multimedia content through a set-top box.

BACKGROUND

Users may view multimedia content through a display attached to a set-top box. Users may navigate a program guide to record multimedia content to watch at a later time. Typically, to record multimedia content, the user selects a recording option associated with the multimedia content. The set-top box, in turn, records the selected multimedia content for the user to view later.

SUMMARY OF PARTICULAR EMBODIMENTS

According to embodiments of the present disclosure, disadvantages and problems associated with live streaming multimedia content through a set-top box (STB) may be reduced or eliminated.

In one embodiment, a STB determines whether to communicate a notification to a user device to live stream multimedia content. The notification comprises an option to initiate live streaming of the multimedia content. The STB communicates the notification to the user device to live stream the multimedia content. A user device communicates a selection to initiate live streaming of the multimedia content to the STB. In response to the selection, the STB live streams the multimedia content to the user device.

Certain embodiments of the present disclosure may provide one or more technical advantages. Technical advantages of one embodiment include improving the user experience by efficiently identifying the multimedia content that has live streaming capability and by providing a notification to one or more of the user devices at the time that the live streaming of the multimedia content is available. Moreover, technical advantages of one embodiment also include improving the functioning of a set-top box by providing security and authorization for the STB before live streaming multimedia content to the user device and improving network efficiency and throughput by optimizing and adapting the live stream content based on the capability of the user device.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DESCRIPTION OF EXAMPLE EMBODIMENTS

Embodiments of the present disclosure and its advantages are best understood by referring to FIGS. 1-4, like numerals being used for like and corresponding parts of the various drawings.

Users may view multimedia content through a display attached to a set-top box. Users may navigate a program guide to record multimedia content to watch at a later time. Typically, to record multimedia content, the user selects a recording option associated with the multimedia content. The set-top box, in turn, records the selected multimedia content for the user to view later.

Recording multimedia content for the user to later view is problematic, however, because the user may want to view the multimedia content in real time. Exacerbating the issue, users may become distracted, may not have access to a display unit that is directly attached to a STB, and may inadvertently miss the live viewing of the multimedia content. In these situations, the user may prefer to live stream the multimedia content to a user device, and, also, may prefer to be notified of the start of the live stream for the multimedia content.

Providing notifications and real-time multimedia content to a user device may present several technical challenges. To efficiently identify the multimedia content that has live streaming capability, the STB may communicate with the content provider to determine whether a specific multimedia content is capable of live streaming. Moreover, to improve the user experience, the STB may provide a notification to one or more of the user devices that live streaming of the multimedia content is available. Furthermore, to improve the security and privacy of live streaming multimedia content, the STB may determine whether one or more of the user devices has authorization and/or permission to live stream the multimedia content. In addition, the STB may optimize and adapt the live streaming of the multimedia content based on the receiving user device. For example, the STB may stream the multimedia content in a certain aspect ratio or resolution based on the capability of the user device. Furthermore, the STB may simultaneously record the multimedia content while live streaming the multimedia content to the user device.

Figure 1:
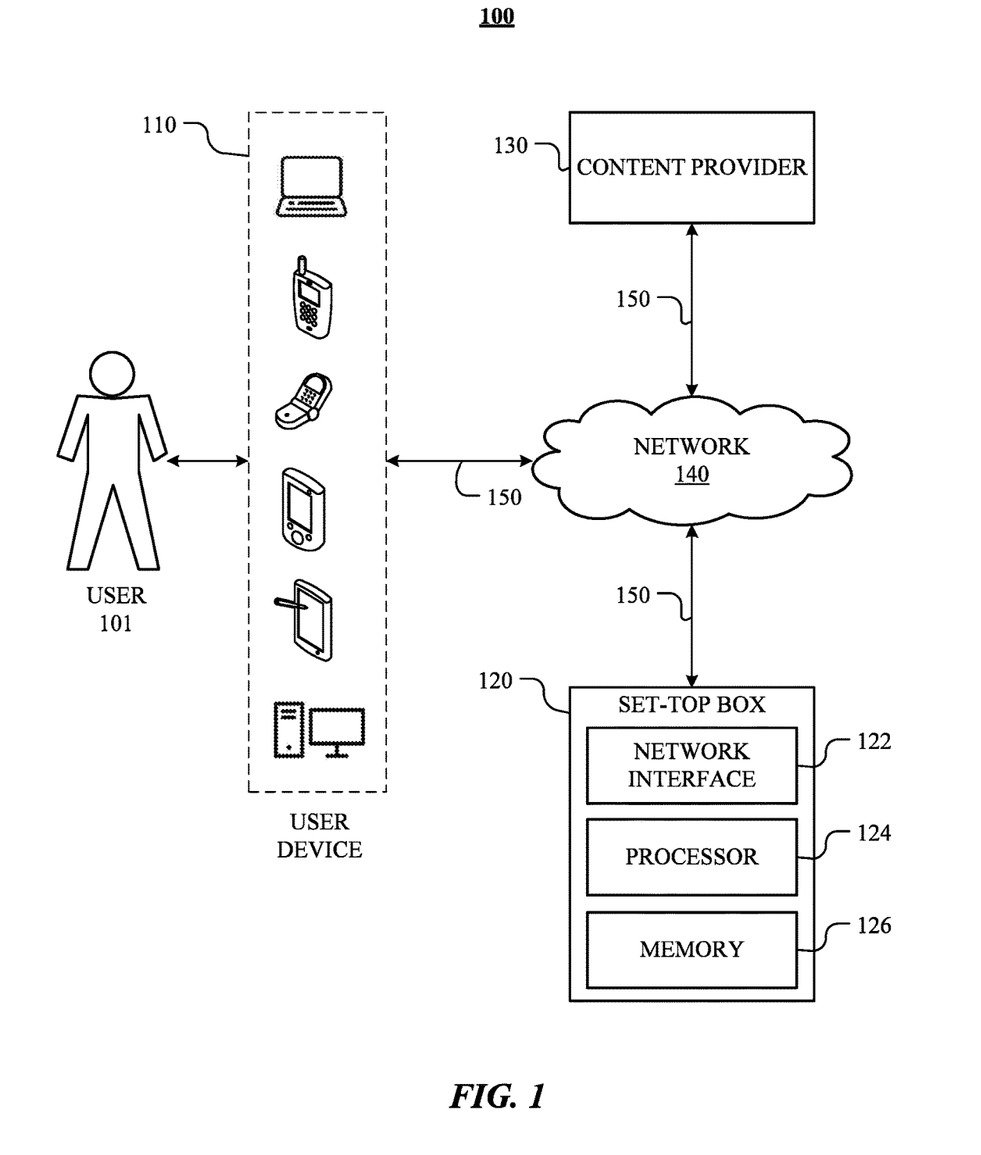
FIG. 1 illustrates an example network environment associated with live streaming multimedia content.

FIG. 1 illustrates an example network environment 100 associated with live streaming multimedia content. Network environment 100 includes a user 101, a user device 110, STB 120, and content provider 130 connected to each other by a network 140. Although FIG. 1 illustrates a particular arrangement of user 101, user device 110, STB 120, content provider 130, and network 140, this disclosure contemplates any suitable arrangement of user 101, user device 110, STB 120, content provider 130, and network 140. As an example and not by way of limitation, two or more of user devices 110, STB 120, and content provider 130 may be connected to each other directly, bypassing network 140. As another example, two or more of user device 110, STB 120, and content provider 130 may be physically or logically co-located with each other in whole or in part. Moreover, although FIG. 1 illustrates a particular number of users 101, user device 110, STB 120, content provider 130, and networks 140, this disclosure contemplates any suitable number of users 101, user device 110, STB 120, content provider 130, and network 140. As an example and not by way of limitation, network environment 100 may include multiple users 101, user devices 110, STBs 120, content providers 130, and networks 140.

In particular embodiments, user 101 may be an individual (human user), an entity (e.g., an enterprise, business, or third-party application), or a group (e.g., of individuals or entities) that interacts or communicates with STB 120 and/or content provider 130 through user device 110. User 101 may navigate a program guide, select multimedia content to record, and perform other interactive functions for viewing multimedia content using STB 120.

User device 110 may access STB 120 or content provider 130 directly, via network 140, or via a third-party system. As an example and not by way of limitation, user device 110 may access content provider 130 via STB 120. In certain embodiments, user 101 must log in and authenticate a user identification and/or password before user device 110 is able to access and communicate with STB 120. User device 110 may be any suitable computing device, such as, for example, a personal computer, a laptop computer, a cellular telephone, a smartphone, a tablet computer, or an augmented/virtual reality device. User device 101 may also include a user interface, such as a keypad, a display, a microphone, or other appropriate terminal equipment for use by user 101. In some embodiments, an application executed by user device 110 may perform the functions described herein. User device 110 may be implemented using any suitable type of processing system and may include any suitable combination of hardware, firmware, and software. Each user device 110 may include any appropriate number of input devices, output devices, mass storage media, processors, memory, or other suitable components for receiving, processing, storing, and communicating data.

STB 120 is generally a device that provides interactive features such that user 101 can access, record, and interact with options providing for multimedia content. In particular embodiments, STB 120 may be a network-addressable computing system that can receive input, generate audio and/or video output for display, and communicate with user device 110. STB 120 may also receive input from content provider 130 and communicate audio and/or video output for display. For example, STB 120 may receive radio frequency analog television input, digital television input, satellite television input, and/or any other suitable type of input that contains a program guide. STB 120 may also receive the program guide from content provider 130.

The program guide may be an application that provides a list of current and scheduled programs that is or will be available on each channel, and, sometimes, a short summary or commentary for each program. Typically, a program guide allows user 101, through an interactive diagram, to access television, radio, and other multimedia content with updated menus displaying broadcast programming or scheduling information for current and upcoming programming. In certain embodiments, program guide may also provide a list of current and scheduled programs that are capable of live streaming. STB 120 may comprise a channel device, an ultra-high frequency (UHF) converter, a cable converter box, a closed captioning box, a digital television adapter, an integrated receiver/decoder, a hybrid box, an Internet Protocol Television (IPTV) receiver, and/or any other suitable device that receives the program guide and live streams multimedia content to user device 110.

Multimedia content consists of television, radio, images, videos, audio, or any other items that may be streamed from one device to another. Multimedia content may be communicated in typical video and/or audio format or may be sent as a compressed form. In certain embodiments, multimedia content is associated with one or more policies. The associated policies may reside on STB 120 or may be communicated from content server 130. Policies may include any suitable rating system or filter that may impact what multimedia content is displayed and to whom the multimedia content is displayed.

For example, policies may include parental guidelines. Parental guidelines represent a television content rating system that typically rates multimedia content based on the subject matter of the content and the suitability for certain audiences. For example, a children's program may receive a parental rating of "TV-Y," indicating that multimedia content is designed for a young audience. As another example, a horror show may receive a parental rating of "TV-14-DLS," indicating that the multimedia content may contain material unsuitable for children under the age of 14. Any suitable rating system may be used for the parental guideline.

In the illustrated embodiment, STB 120 includes network interface 122, processor 124, and memory 126. Network interface 122 facilitates communication between processor 124, network 140, or other components of network environment 100. Network interface 122 may facilitate communication over portions of network 140 or over a separate data network. For example, network interface 122 may live stream one or more multimedia contents to one or more user devices 110. In particular embodiments, network interface 122 includes or represents one or more network interface cards (NICs).

Processor 124 may represent or include any form of processing components, including dedicated microprocessors, general-purpose computers, or other devices capable of processing electronic information. Examples of processor 124 include field-programmable gate arrays (FPGAs), programmable microprocessors, digital signal processors (DSPs), application-specific integrated circuits (ASICs), and any other suitable specific- or general-purpose processors. For example, processor 124 may determine whether user 101 and/or user device 110 are permitted and allowed to live stream a particular multimedia content. As another example, processor 124 may determine which multimedia content is capable of being live streamed. Although FIG. 1 illustrates, for the sake of simplicity, an embodiment of STB 120 that includes a single processor 124, STB 120 may include any number of processors 124 configured to interoperate in any appropriate manner.

Memory 126 stores processor instructions and/or any other data utilized by STB 120 during operation. Memory 126 may comprise any collection and arrangement of volatile or non-volatile, local or remote devices suitable for storing data, such as random access memory (RAM), read only memory (ROM), magnetic storage, optical storage, or any other suitable type of data storage components. For example, memory 126 may store an authorization policy setting and an authorized user group setting associated with one or more users 101 and/or one or more user devices 110. Although shown as a single element in FIG. 1, memory 126 may include one or more physical components local to or remote from STB 120.

Content provider 130 generally communicates the program guide and multimedia content to STB 120. For example, content provider 130 may communicate multimedia content to STB 120 via network 140. In some embodiments, content provider 130 communicates multimedia content directly to STB 120. In some embodiments, content provider 130 may communicate multimedia content to STB 120 via radio frequency signals transmitted through coaxial cables. Content provider 130 may also communicate the program guide to STB 120. In certain embodiments, content provider 130 may communicate the live streaming capability of each multimedia content with the program guide. Content provider 130 may communicate the program guide and/or multimedia content via light pulses through fiber-optic cables, over the air radio waves, through network 140 (e.g., through the internet or telephone network), or any other suitable means of transmission. In certain embodiments, content provider 130 identifies the multimedia content that is available for live streaming to STB 120.

This disclosure contemplates any suitable network 140. As an example and not by way of limitation, one or more portions of network 140 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 140 may include one or more networks 140.

Links 150 may connect user device 110, STB 120, and content provider 130 to communication network 140 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In an exemplary embodiment of operation, STB 120 displays a program guide to user 101. In certain embodiments, STB 120 may also indicate whether a certain multimedia content is capable of live streaming. STB 120 may communicate with content provider 130 to determine whether a certain multimedia content is capable of live streaming. For example, STB 120 may communicate a query to content provider 130 requesting the live streaming capability for one or more multimedia content, and, in response, content provider 130 may communicate the live streaming capability for the requested one or more multimedia content. In alternative embodiments, content provider 130 may communicate the program guide to STB 120, wherein the program guide contains information comprising whether multimedia content is capable of live streaming. In addition, STB 120 may communicate a notification to live stream the multimedia content. The STB 120, in certain embodiments, may first communicate an option for a user to receive a notification to live stream the multimedia content. This option for a notification may be displayed on user device 110, displayed in the program guide for user 101 to select, or as a default notification that user 101 selects to record the multimedia content. In certain embodiments, the option for a notification may be available in a separate program guide that illustrates multimedia content capable of live streaming.

In this example, STB 120 communicates the notification to user device 110 to live stream the multimedia comment. STB 120 may communicate the notification as an e-mail, a text message (e.g., short message server), a push notification, or any other type of notification that alerts user 101 of an upcoming live streaming of multimedia content on user device 110. The timing of the notification may vary. For example, the notification may occur before a pre-determined amount of time before live streaming of multimedia content begins. User 101 may establish the timing to send the notification, or STB 107 may communicate the notification a set time before beginning to live stream the multimedia content. Moreover, in certain embodiments, STB 120 may communicate multiple notifications to user 101 over various user devices 110. For example, STB 120 may communicate one or more push notifications to user 101 over a mobile device in user device 110 and also communicate an e-mail notification to a laptop in user device 110. The notification may comprise an option to initiate live streaming of the multimedia content. In certain embodiments, the option to live stream the multimedia content may comprise live streaming the multimedia content in the future. In certain embodiments, the notification contains a uniform resource locator that directs user 101 to access a web address containing the live stream of the multimedia content.

In certain embodiments, STB 120 may communicate a notification to user 101 to live stream multimedia content based on an analysis of the user 101 viewing history or indicated preferences. STB 120 may analyze the viewing history (e.g., recorded programs, live streamed programs, genre of programs, actors/actresses of programs) to determine multimedia content that may interest user 101. For example, STB 120 may analyze the viewing history of user 101 to determine that user 101 watches sports games involving Team A. STB 120 may then identify the next multimedia content (e.g., Team A football match), and communicate a notification to user 101 to live stream the next multimedia content that relates to Team A. User 101 may also set preferences for multimedia content for which user device 110 should receive a notification. For example, user 101 may indicate that his or her favorite team is Team A and that the preferred user device is the mobile device of user 101. STB 120 may then communicate a notification to the mobile device of user 101 to live stream all multimedia content that relates to Team A.

User 101 may select to initiate live streaming of the multimedia content on user device 110. In this example, user device 110 communicates to STB 120 to initiate live streaming of the multimedia content. In certain embodiments, user device 110 may communicate to STB 120 to initiate live streaming of the multimedia content at a later time. Alternatively, user device 110 may communicate to STB 120 to initiate live streaming of the multimedia content immediately. User 101 may also indicate to STB 120 to communicate a reminder to user device 110 at a later time (e.g., by a set time before, during, or after multimedia content begins).

In response to the selection by user 101 to initiate live streaming of the multimedia content, STB 120 may live stream immediately, or at a later time, multimedia content to one or more user devices 110. Live streaming is a term used to describe the process of broadcasting multimedia content to user device 110 in real time. Typically, a live stream of multimedia content is constantly being delivered from STB 120 to user device 101. Rather than user device 101 downloading a portion of the multimedia content first, user device 101 displays the multimedia content as soon as it is received. STB 120 may utilize the Internet to live stream the multimedia content to user 101. In certain embodiments, STB 120 may simultaneously live stream the multimedia content to user device 110 and also record the multimedia content in memory 126. When the recording option is implemented, user 101 may rewind or pause multimedia content on user device 110 during the live stream. Moreover, user 101 may also view the multimedia content after the live stream ends.

In certain embodiments, STB 120 may communicate a second notification to user device 110 to live stream second multimedia content. Similar to the first notification to user device 110, the second notification may comprise an option to initiate live streaming of a second multimedia content. While live streaming the first multimedia content to user device 110, user device 110 may communicate a selection to initiate live streaming of the second multimedia content. In response to the selection to initiate live streaming of the second multimedia content, STB 120 may live stream the second multimedia content to user device 110 while simultaneously live streaming the first multimedia content to user device 110. In certain embodiments, STB 120 will communicate the first multimedia content and second multimedia content in the same stream to user device 110. In alternative embodiments, STB 120 may interleave streams of the first multimedia content with the second multimedia content. In addition, users 101 may rewind or pause either first multimedia content or second multimedia content if the multimedia content is also being recorded.

STB 120 may also support an authorization model. In certain embodiments, only authorized users 101 and/or authorized user devices 110 may receive live streaming multimedia content. These select users 101 and/or select user devices 110 may belong to an authorized user group. Similarly, certain users 101 and/or certain user devices 110 may be blocked from live streaming multimedia content. STB 120 may store the authorized user group in memory 126. In certain embodiments, STB 120 may receive the authorized user group from content server 130. In certain embodiments, STB 120 determines whether users 101 and/or user device 110 belong to an authorized user group. STB 120 may determine whether user 101 and/or user device 110 belong to an authorized user group when user device 110 accesses STB 120, before STB displays the program guide to user 101 and/or user device 110, before STB communicates a notification to user 101, before STB live streams multimedia content to user 101, or any other suitable time that STB may determine whether user 101 and/or user device 110 belongs to an authorized user group. In certain embodiments, STB 120 will communicate the notification or live stream the video only when user 101 and/or user device 110 belongs to the authorized user group In addition, STB 120 may support a viewing policy model. In certain embodiments, users 101 and/or user devices 110 may be associated with one or more policies to view multimedia content. For example, if parental guidelines are supported by STB 120, parents may watch "Mature Audiences only" content, while children are blocked from "Mature Audiences only" content. The acceptable parental guidelines or maximum parental guidelines (e.g., maximum parental guide is "General Audience") are associated with select users 101 and/or select user devices 110. The viewing policy setting may be stored in STB 120 or content server 130.

In certain embodiments, STB 120 determines the authorization and/or viewing policies settings associated with user 101 and/or user device 110. STB 120 may then determine whether multimedia content belongs to the acceptable viewing group associated with user 101 and/or user device 110. If the multimedia content does not belong to the acceptable viewing group, STB 120 may prohibit displaying the multimedia content in the program guide, communicating a notification to user 101, or any other type of prevention that prohibits user 101 and/or user device 110 from live streaming the multimedia content on user device 110. On the other hand, STB 120 may communicate a notification and live stream multimedia content to user device 110 only when the parental guideline of the multimedia content belongs to the acceptable viewing group of user 101 and/or user device 110.

Modifications, additions, or omissions may be made to network environment 100. For example, user device 110 may include any number of user devices 110. Furthermore, the components of network environment 100 may be integrated or separated. For example, STB 120 and content provider 130 may be incorporated into a single component.

Figure 2:
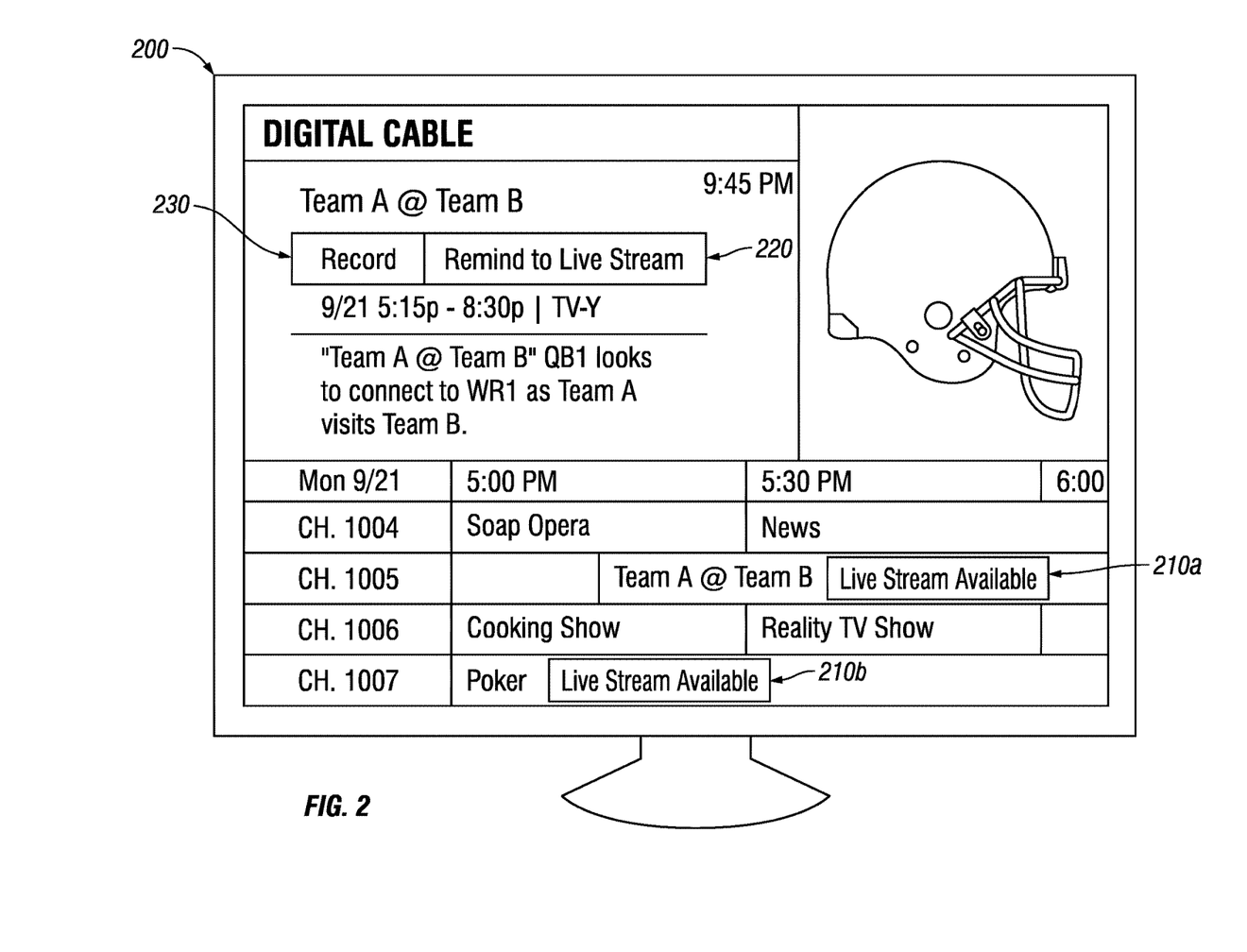
FIG. 2 illustrates an example program guide displayed by a set-top box.

FIG. 2 illustrates an example program guide 200 displayed by STB 120. For example, user 101 may navigate program guide 200 to select multimedia content for recording or live streaming multimedia content now or at a later time. In FIG. 2, live stream availability options 210a-b, notification option 220, and record option 230 are examples of graphical representations displayed on program guide 200 to assist user 101 in determining the programming options available for each multimedia content.

Live stream availability options 210a-b are graphical representations indicating that the corresponding multimedia content has live streaming capability. STB 120 may determine whether each multimedia content has live streaming capability by communicating with content provider 130. For example, content provider 130 may provide a list of multimedia content that has live streaming capabilities to STB 120. In the illustrated embodiment, live stream capability option 210a may illustrate that multimedia content "Team A @ Team B" may be live streamed at 5:15 pm. Similarly, live stream capability option 210b may illustrate that user 101 may live stream the multimedia content "Poker."

Notification option 220 provides user 101 the option for STB 120 to communicate a notification to user device 110. For example, user 101 may select notification option 220 in order to receive a notification on user device 110 that user 101 may live steam multimedia content "Team A @ Team B" on user device 110.

Record option 230 allows user 101 the option for STB 120 to record the multimedia content. In certain embodiments, STB 120 may record the multimedia content while live streaming the multimedia content simultaneously. Record option 230 in FIG. 3 may provide user 101 the option for STB 120 to record the multimedia content "Team A @ Team B." Typically, the recorded multimedia content will be stored on memory 126 for later viewing.

Figure 3:
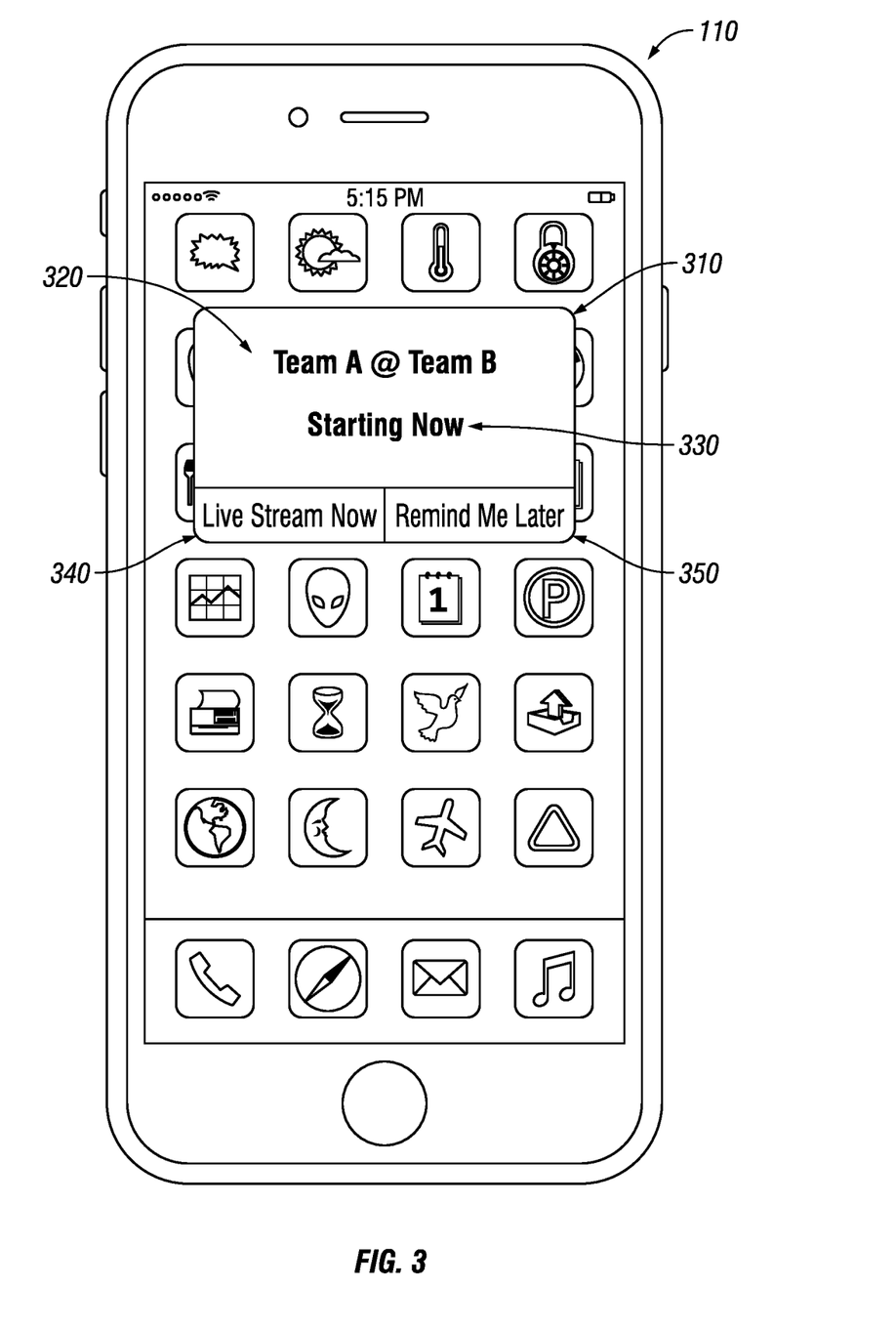
FIG. 3 illustrates example notification displayed on a user device.

FIG. 3 illustrates example notification 310 displayed on user device 110. Notification 310 may indicate that multimedia content is available to live stream to user device 110 either currently or in the future. While notification 310 is illustrated as a mobile device notification in FIG. 3, notification 310 may be an e-mail, a text message, or a push notification on user device 110. Notification 310 may provide user 101 context of the live streaming content, such as program title 320 and start time 330. Notification 310 may also include various options, such as live stream now option 320 and delay reminder option 330.

Program title 320 indicates the title of the program associated with notification 310. For example, program title 320 may indicate the name of a program that user 101 may live stream. Program title 320 may include an image that indicates the program associated with notification 310. For example, the image may include one or more cast members of the program or any other suitable image that facilitates identifying the program. In some embodiments, the image may be a video image, such as a live stream of the program.

If user 101 selects the live stream now option 320, user 101 may receive a live stream of the "Team A @ Team B" multimedia content after STB 120 ensures that user 101 is permitted and/or authorized to live stream the multimedia content. On the other hand, user 101 may select the delay reminder option 330, which allows user 101 to receive another notification 310 at a later time.

Start time 330 indicates the time the multimedia content is scheduled to begin. For example, start time 330 may display 5:15 p.m., when the multimedia content associated with notification is scheduled to begin at 5:15 p.m. Start time 330 may also indicate that the multimedia content started, is already playing, or is a countdown of the time remaining before the multimedia content is scheduled to start. In this example, the countdown may display a numerical countdown of the time left before the program is scheduled to begin. For example, if a program is scheduled to begin in three minutes, the countdown may state "3:00." The countdown may tick down every second until the program begins (e.g., 2:59, 2:58, etc.), and may include minutes, seconds, milliseconds, and/or any other suitable measure of time.

Figure 4:
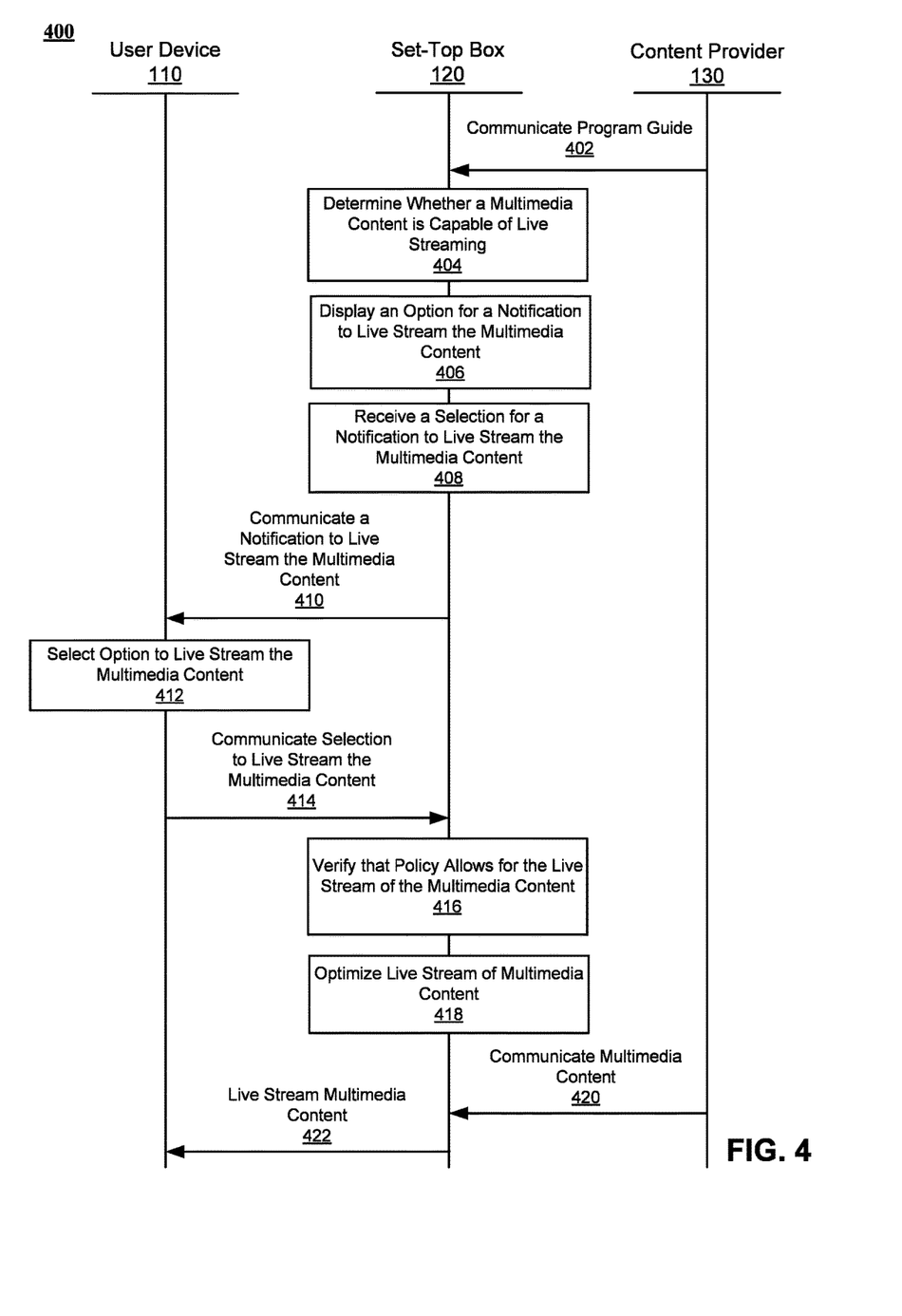
FIG. 4 illustrates an exemplary signaling diagram depicting the interaction between a user device, set-top box, and content provider.

FIG. 4 illustrates an exemplary signaling diagram 400 depicting the interaction between user device 110, STB 120, and content provider 130. More than one client system 110, STB 120, and/or content provider 130 may exist in the system described herein.

In step 402, content provider 130 communicates a program guide to STB 120. In step 404, STB 120 determines whether multimedia content is capable of live streaming. In certain embodiments, content provider 130 provides an indication of whether certain multimedia content is capable of live streaming. STB 120 can then determine whether the multimedia content is capable of live streaming. In alternate embodiments, STB 120 communicates with content provider 130 after receiving the program guide to determine whether certain multimedia content is capable of live streaming.

In step 406, STB 120 displays an option to receive a notification to live stream the multimedia content. STB 120 may display the option to receive a notification to live stream the multimedia content on the program guide or on one or more user devices 110.

In step 408, STB 120 receives a selection to receive a notification to live stream the multimedia content. In certain embodiments, user 101 selects to receive the notification to live stream the multimedia content by interacting with the program guide. In this embodiment, user 101 may specify which of the user devices 110 will receive the notification to live stream the multimedia content. In an alternative embodiment, user 101 selects to receive a notification to live stream the multimedia content through user device 110. In this embodiment, STB 120 may determine which user device 110 to communicate the notification to live stream to and/or may communicate the reminder notification to the user device 110 that selected the option.

At step 410, STB 120 may then communicate a notification to user device 110 to live stream the multimedia comment. STB 120 may communicate the notification as an e-mail, a text message, or a push notification on user device 110. The timing of the notification may vary. The notification may occur before, during, or after the availability to live stream multimedia content. Moreover, in certain embodiments, STB 120 may communicate multiple notifications to user 101 over various user devices 110. For example, STB 120 may communicate one or more push notifications to user 101 over a mobile device and also communicate an e-mail notification to a laptop. The notification may comprise an option to initiate live streaming of the multimedia content. The option to initiate live streaming of the multimedia content may comprise live streaming the multimedia content upon user 101 selecting to initiate live streaming of the multimedia content.

At step 412, user 101 may select to initiate live streaming of the multimedia content on user device 110. At step 414, user device 110 may then communicate to STB 120 the selection to initiate live streaming of the multimedia content. User 101 may also select to be reminded of imitating the live stream of the multimedia content on user device 110 at a later time.

At step 416, STB 120 may verify that a policy associated with user 101 and/or user device 110 allows for the live stream of the multimedia content. In certain embodiments, STB 120 may verify that the user is authorized and permitted to live stream the multimedia content. STB 120 may determine whether user 101 and/or user device 110 is authorized to live stream the multimedia content, and, only upon authorization, may STB 120 live stream the multimedia content. Similarly, in certain embodiments, only permitted users 101 and/or permitted user devices 110 may receive live streaming content. STB 120 may determine whether a policy associated with the multimedia content, such as a parental guideline, belongs to the acceptable viewing group for user 101 and/or user device 110.

At step 418, STB 120 may optimize the live stream of the multimedia content for user device 110. STB 120 may adapt the live stream of the multimedia content based on user device 110. STB 120 may adapt the resolution, aspect ratio, brightness, frame rate, or any other options that may affect the size or quality of the stream based on user device 110. For example, STB 120 may stream the multimedia content in a certain aspect ratio, resolution, or compression based on the capability of user device 110.

At step 420, content provider 130 may communicate the multimedia content to STB 120. In certain embodiments, content provider 130 communicates only the selected multimedia content to STB 120. In other embodiments, content provider 130 communicates a broadcast signal to STB 120, and STB 120 tunes the broadcast signal to the proper signal containing the multimedia content.

At step 422, STB 120 live streams the multimedia content to user device 110. STB 120 may utilize network 140 to live stream the multimedia content to user 101. In certain embodiments, STB 120 may simultaneously live stream the multimedia content to user device 110 and also record the multimedia content in memory 126.

Modifications, additions, or omissions may be made to method 400 depicted in FIG. 4. Method 400 may include more, fewer, or other steps. For example, STB 120 may not optimize the live stream according to user device 110. Steps may also be performed in parallel or in any suitable order. While discussed as specific components completing the steps of method 400, any suitable component of network environment 100 may perform any step of method 400.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
    determining, by a set-top box, that first multimedia content is capable of live streaming, the determining including:
        providing, by the set-top box and to a content provider, a query requesting a live streaming capability of the first multimedia content,
        in response to the query requesting the live streaming capability of the first multimedia content, receiving, by the set-top box and from the content provider, the live streaming capability of the first multimedia content that indicates that the first multimedia content is able to be livestreamed;
    providing, by the set-top box, for display, a program guide, the program guide including i) a graphical representation of the first multimedia content and ii) a graphical representation indicating a notification option to live stream the first multimedia content;
    receiving, by the set-top box, input indicating i) a selection of the notification option to receive a notification to live stream the first multimedia content and ii) a particular user device of a plurality of user devices to receive the notification, the particular user device not directly coupled to the set-top box;
    determining, by the set-top box, to communicate the notification to the particular user device to live stream the first multimedia content, wherein the notification comprises an option to initiate live streaming of the first multimedia content;
    communicating, by the set-top box, the notification to the particular user device to live stream the first multimedia content;
    receiving, from the particular user device, a selection to initiate live streaming of the first multimedia content; and
    in response to the selection to initiate live streaming of the first multimedia content, live streaming, from the set-top box, the first multimedia content to the particular user device.

2. The method of claim 1, wherein live streaming the multimedia content to the particular user device further comprises simultaneously recording the first multimedia content while live streaming the first multimedia content to the particular user device.

3. The method of claim 1, further comprising analyzing a viewing history of a user to determine the first multimedia content to live stream to the particular user device associated with the user.

4. The method of claim 1, further comprising:
    communicating, by the set-top box, a second notification to the particular user device to live stream second multimedia content, wherein the second notification comprises an option to initiate live streaming of the second multimedia content;
    receiving, from the particular user device, a selection to initiate live streaming of the second multimedia content; and
    in response to the selection to initiate live streaming of the second multimedia content, live streaming the second multimedia content to the particular user device, wherein the second multimedia content is live streamed simultaneously with the first multimedia content.

5. The method of claim 1, wherein the particular user device is associated with a policy, and further comprising:
    determining whether the policy allows for the live streaming of the first multimedia content; and
    live streaming from the set-top box, the first multimedia content to the particular user device when the policy allows for the live streaming of the first multimedia content.

6. The method of claim 1, further comprising:
    determining whether the particular user device belongs to an authorized user group; and
        wherein communicating, by the set-top box, the notification to the particular user device to live stream the first multimedia content occurs when the particular user device belongs to the authorized user group.

7. One or more computer-readable non-transitory storage media embodying software that is operable when executed to:
    determine that first multimedia content is capable of live streaming, the determining including:
        providing, to a content provider, a query requesting a live streaming capability of the first multimedia content,
        in response to the query requesting the live streaming capability of the first multimedia content, receiving, from the content provider, the live streaming capability of the first multimedia content that indicates that the first multimedia content is able to be livestreamed;
    provide, by the set-top box, for display, a program guide, the program guide including i) a graphical representation of the first multimedia content and ii) a graphical representation indicating a notification option to live stream the first multimedia content;
    receive, by the set-top box, input indicating i) a selection of the notification option to receive a notification to live stream the first multimedia content and ii) a particular user device of a plurality of user devices to receive the notification, the particular user device not directly coupled to the set-top box;

determine to communicate the notification to the particular user device to live stream the first multimedia content, wherein the notification comprises an option to initiate live streaming of the first multimedia content;

communicate the notification to the particular user device to live stream the first multimedia content;

receive, from the particular user device, a selection to initiate live streaming of the first multimedia content; and in response to the selection to initiate live streaming of the first multimedia content, live stream the first multimedia content to the user device.

8. The media of claim 7, wherein live streaming the first multimedia content to the particular user device further comprises simultaneously recording the first multimedia content while live streaming the first multimedia content to the particular user device.

9. The media of claim 7, wherein the software is further operable when executed to analyze a viewing history of a user to determine the first multimedia content to live stream to the particular user device associated with the user.

10. The media of claim 7, wherein the software is further operable when executed to:

communicate a second notification to the articular user device to live stream second multimedia content, wherein the second notification comprises an option to initiate live streaming of the second multimedia content;

receive, from the particular user device, a selection to initiate live streaming of the second multimedia content; and in response to the selection to initiate live streaming of the second multimedia content, live stream the second multimedia content to the particular user device, wherein the second multimedia content is live streamed simultaneously with the first multimedia content.

11. The media of claim 7, wherein the particular user device is associated with a policy, and the software is further operable when executed to:

determine whether the policy allows for the live streaming of the first multimedia content; and live stream, from the set-top box, the first multimedia content to the particular user device when the policy allows for the live streaming of the first multimedia content.

12. The media of claim 7, wherein the software is further operable when executed to determine whether the particular user device belongs to an authorized user group; and wherein communicating the notification to the particular user device to live stream the first multimedia content occurs when the particular user device belongs to the authorized user group.

13. A system comprising one or more processors and a memory coupled to the processors comprising instructions executable by the processors, the processors being operable when executing the instructions to:

determine that first multimedia content is capable of live streaming, the determining including:

providing, to a content provider, a query requesting a live streaming capability of the first multimedia content, in response to the query requesting the live streaming capability of the first multimedia content, receiving, from the content provider, the live streaming capability of the first multimedia content that indicates that the first multimedia content is able to be livestreamed;

provide, by the set-top box, for display, a program guide, the program guide including i) a graphical representation of the first multimedia content and ii) a graphical representation indicating a notification option to live stream the first multimedia content;

receive, by the set-top box, input indicating i) a selection of the notification option to receive a notification to live stream the first multimedia content and ii) a particular user device of a plurality of user devices to receive the notification, the particular user device not directly coupled to the set-top box;

determine to communicate the notification to the particular user device to live stream first multimedia content, wherein the notification comprises an option to initiate live streaming of the first multimedia content;

communicate the notification to the particular user device to live stream the first multimedia content;

receive, from the particular user device, a selection to initiate live streaming of the first multimedia content; and in response to the selection to initiate live streaming of the first multimedia content, live stream the first multimedia content to the user device.

14. The system of claim 13, wherein live streaming the first multimedia content to the particular user device further comprises simultaneously recording the first multimedia content while live streaming the first multimedia content to the particular user device.

15. The system of claim 13, wherein the processors are further operable when executing the instructions to analyze a viewing history of a user to determine the first multimedia content to live stream to the particular user device associated with the user.

16. The system of claim 13, wherein the processors are further operable when executing the instructions to:

communicate a second notification to the particular user device to live stream second multimedia content, wherein the second notification comprises an option to initiate live streaming of the second multimedia content;

receive, from the particular user device, a selection to initiate live streaming of the second multimedia content; and in response to the selection to initiate live streaming of the second multimedia content, live stream the second multimedia content to the particular user device, wherein the second multimedia content is live streamed simultaneously with the first multimedia content.

17. The system of claim 13, wherein the particular user device is associated with a policy, and the processors are further operable when executing the instructions to:

determine whether the policy allows for the live streaming of the first multimedia content; and live stream from the set-top box, the first multimedia content to the particular user device when the policy allows for the live streaming of the first multimedia content.

18. The system of claim 13, wherein the processors are further operable when executing the instructions to determine whether the particular user device belongs to an authorized user group; and wherein communicating the notification to the particular user device to live stream the first multimedia content occurs when the particular user device belongs to the authorized user group.

* * * * *